(12) United States Patent
Kawamoto

(10) Patent No.: US 6,334,501 B1
(45) Date of Patent: Jan. 1, 2002

(54) EXHAUST SYSTEM FOR A MOTORCYCLE

(75) Inventor: Hitoshi Kawamoto, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 09/642,503

(22) Filed: Aug. 18, 2000

(30) Foreign Application Priority Data

Sep. 16, 1999 (JP) ............................................. 11-262285

(51) Int. Cl.⁷ ............................................... B60K 13/04
(52) U.S. Cl. ....................................... 180/309; 180/219
(58) Field of Search .............................. 180/309, 219, 180/225, 89.2; 60/313, 323; 181/238, 251

(56) References Cited

U.S. PATENT DOCUMENTS

| | | | |
|---|---|---|---|
| 4,327,811 A | * | 5/1982 | Isaka |
| 4,359,865 A | * | 11/1982 | Nakao et al. |
| 4,522,282 A | * | 6/1985 | Yamamoto |
| 4,795,420 A | * | 1/1989 | Sakurai et al. |
| 5,979,583 A | * | 11/1999 | Amino et al. |
| 6,193,004 B1 | * | 2/2001 | Cooksey et al. |

FOREIGN PATENT DOCUMENTS

JP 58 214416 12/1983
JP 60 93111 5/1985

* cited by examiner

*Primary Examiner*—Kevin Hurley
(74) *Attorney, Agent, or Firm*—Darby & Darby

(57) ABSTRACT

In an exhaust system for a motorcycle with a V-type engine mounted thereon, the front cylinder exhaust line has a first exhaust pipe arranged to the front while the rear cylinder exhaust line has a second exhaust pipe arranged to the rear. The first and second mufflers are attached to one side of the vehicle body with the second muffler arranged in parallel to and above the first muffler and shifted behind with respect to the first muffler. The first expansion chamber of the first muffler and the first expansion chamber of the second muffler are connected to be in communication with each other by means of a communicating pipe. One end of the communicating pipe is joined to the peripheral surface of the muffler cylinder corresponding to the first expansion chamber of the first muffler while the other end is connected in parallel with the second exhaust pipe to the front-end entrance port of the second muffler corresponding to the first expansion chamber of the second muffler.

4 Claims, 7 Drawing Sheets

EXHAUST SYSTEM FOR A MOTORCYCLE

BACKGROUND OF THE INVENTION

(1) Field of the Invention

The present invention relates to an exhaust system for a motorcycle which have a V-type multi-cylinder engine such as a V-type two-cylinder engine mounted thereon, and more detailedly relates to an exhaust system for a motorcycle wherein joining between front and rear exhaust lines being in communication with each other and assembly of mufflers to the motorcycle body are taken into consideration.

(2) Description of the Prior Art

As one example of a conventional exhaust system for a motorcycle of this type, a first exhaust pipe 2A is extended from the exhaust of the front cylinder 1A side of a V-type two cylinder engine unit 1 mounted on a vehicle body A and connected to a first muffler 3 forming a forward exhaust arrangement while a second exhaust pipe 2B is extended from the exhaust of the rear cylinder 1B side and connected to a second muffler 4 forming a backward exhaust arrangement, and these first and second mufflers 3 and 4 are assembled to one side of vehicle body A, as shown in FIG. 1.

When such an exhaust system is assembled to vehicle body A, second muffler 4 is arranged above and shifted behind, with respect to first muffler 3, as shown in FIG. 2, so that the two are assembled parallel to each other while in order to enable effective use of mutual exhaust interference, a communicating pipe 5 is provided so as to create a connection between a first expansion chamber 31 on the entrance port 3a side of an expansion chamber 30 of first muffler 3 of the front cylinder 1A exhaust line and second exhaust pipe 2B of the rear cylinder 1B exhaust line, or between first exhaust pipe 2A and second exhaust pipe 2B in their halfway points, though not shown.

However, in the exhaust system having the above conventional configuration, the distance from the position at which communicating pipe 5 is joined to first exhaust pipe 2A to the entrance port 4a of second muffler 4 is rather long, or the distance from the joined point of first exhaust pipe 2A to entrance port 3a of first muffler 3 differs too much from that from the joined point of second exhaust pipe 2B to entrance port 4a of second muffler 4 when first exhaust pipe 2A and second exhaust pipe 2B are connected, so that it is impossible to utilize mutual exhaust interference in an effective enough manner.

Further, when first and second mufflers 3 and 4 are assembled to vehicle body A, the middle part of first muffler 3 but rather closer to the rear end and the middle part of second muffler 4 but rather closer to the front end are joined and welded by means of a bracket 61 and the more or less middle part of first muffler 3 is attached to vehicle body A by means of a bracket 62, as shown in FIG. 2 Alternatively, as shown in FIG. 3, first muffler 3 is attached to vehicle body A at its front and rear points by means of first and second brackets 61 and 62 while the front part of second muffler 4 is attached to vehicle body A by means of a third bracket 63.

The assembly configuration shown in FIG. 3 not only has difficulties in assembling first and second mufflers 3 and 4 to vehicle body A but needs more assembly parts and hence costs more.

In the assembly configuration in FIG. 2, since second muffler 4 is fitted to vehicle body A, at position nearer to the front, the extension of second muffler 4 from its fitted position to the rear is too long. Therefore, excessive stresses are liable to concentrate on the fitted point of second muffler 4 when vehicle body A vibrates or from other reasons, thus prevention of the durability degradation of the second muffler is sought.

SUMMARY OF THE INVENTION

The present invention has been devised in view of the above situations, and it is therefore an object of the present invention to provide an exhaust system for a motorcycle which enables effective use of mutual exhaust interference and still allows for easy assembly to the vehicle body.

In order to achieve the above object, the present invention is configured as follows:

In accordance with the first aspect of the present invention, an exhaust system for a motorcycle in which a fore-and-aft V-type engine having front and rear cylinders arranged in a V-angled to each other along the front-to-rear direction of the vehicle body is mounted, wherein the first exhaust line from the front cylinder includes a first exhaust pipe which is extended from the front side of the front cylinder, creating a forward exhaust arrangement while the second exhaust line from the rear cylinder includes a second exhaust pipe which is extended from the rear side of the rear cylinder, creating a backward exhaust arrangement, and the first and second exhaust pipes originating from the front and rear cylinders are connected to the respective front-end entrance ports of the first and second mufflers which are arranged below and above on one side, either right or left, in the rear-half of the vehicle in cylindrical shape, so as to be parallel to each other, while the first and second exhaust lines are connected to each other by a communicating pipe, and is characterized in that the first and second mufflers are arranged so that the second muffler is shifted behind with respect to the first muffler while the communicating pipe is arranged so that one end thereof is joined to the peripheral surface of the muffler cylinder corresponding to the first expansion chamber of the first muffler and the other end is connected in parallel with the second exhaust pipe to the front-end entrance port of the second muffler corresponding to the first expansion chamber of the second muffler.

In accordance with the second aspect of the present invention, the exhaust system for a motorcycle having the above first feature is characterized in that the first muffler has a double-wall configuration made up of inner and outer cylinders and a through-connection element which passes through the inner and outer cylinders to allow for communication with first expansion chamber is arranged at the position on the peripheral surface of the first muffler outer cylinder to which the communicating pipe is joined, and in that the connecting end of the communicating pipe has an opening greater in diameter than that of the opening of the through-connection element formed on the periphery of the muffler outer cylinder and is attached to the peripheral surface of the muffler outer cylinder so that the opening of the communicating pipe at the connecting end covers the opening of the through-connection element.

In accordance with the third aspect of the present invention, the exhaust system for a motorcycle having the above first feature is characterized in that the first and second mufflers are coupled integrally by the communicating pipe in the front and also by a second bracket in the rear while a first bracket is provided in the forepart of first muffler which is located ahead, so that the mufflers are fitted and supported on the vehicle body by both the first and second brackets.

In accordance with the fourth aspect of the present invention, the exhaust system for a motorcycle having the above second feature is characterized in that the first and second mufflers are coupled integrally by the communicating pipe in the front and also by a second bracket in the rear while a first bracket is provided in the forepart of first muffler which is located ahead, so that the mufflers are fitted and supported on the vehicle body by both the first and second brackets.

DESCRIPTION OF THE PREFERRED EMBODIMENTS

The embodiment of the present invention will hereinafter be described in detail with reference to FIGS. 4 to 6.

Figure 1:
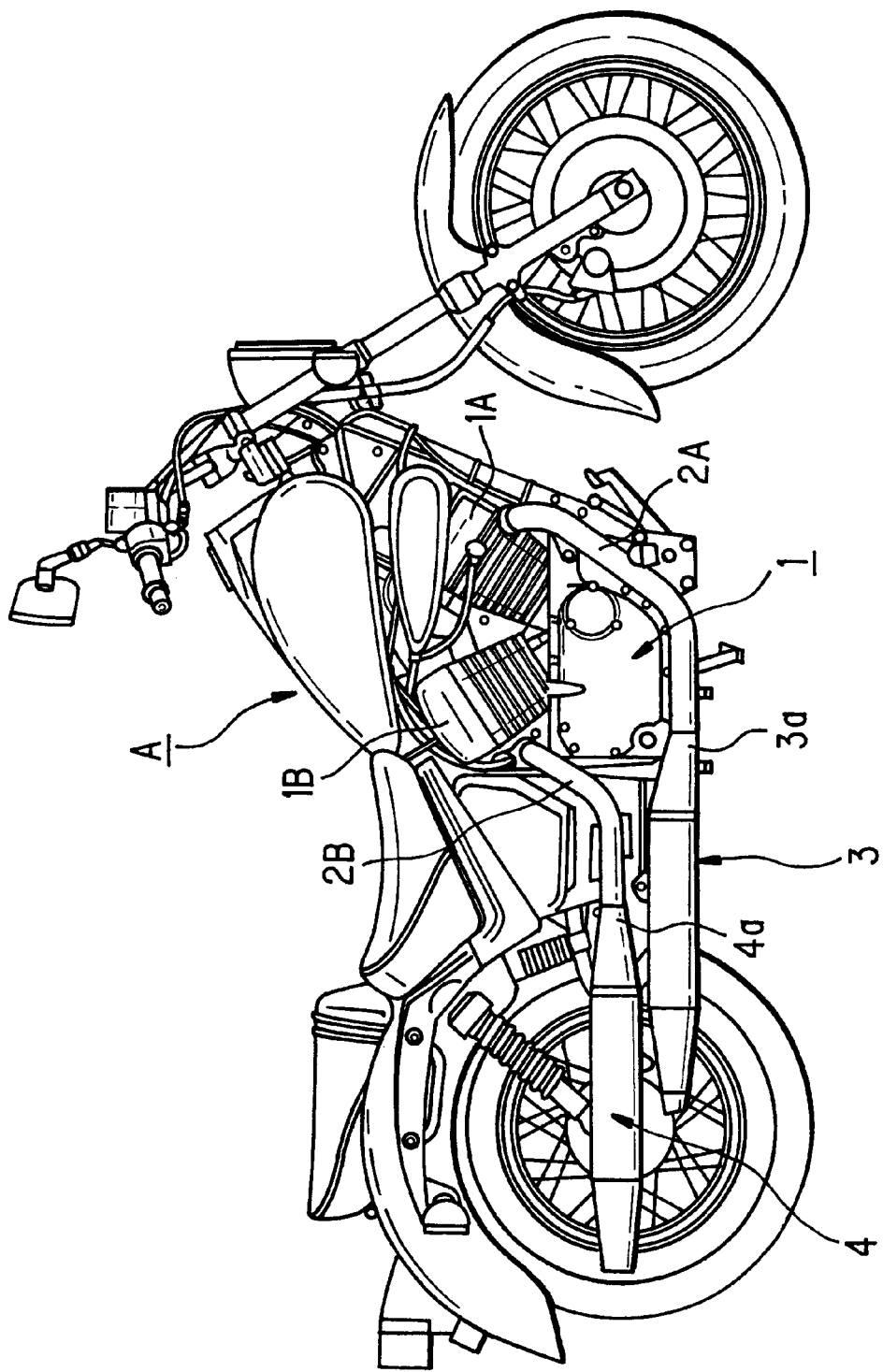
FIG. 1 is a side view showing a conventional motorcycle.
Figure 2:
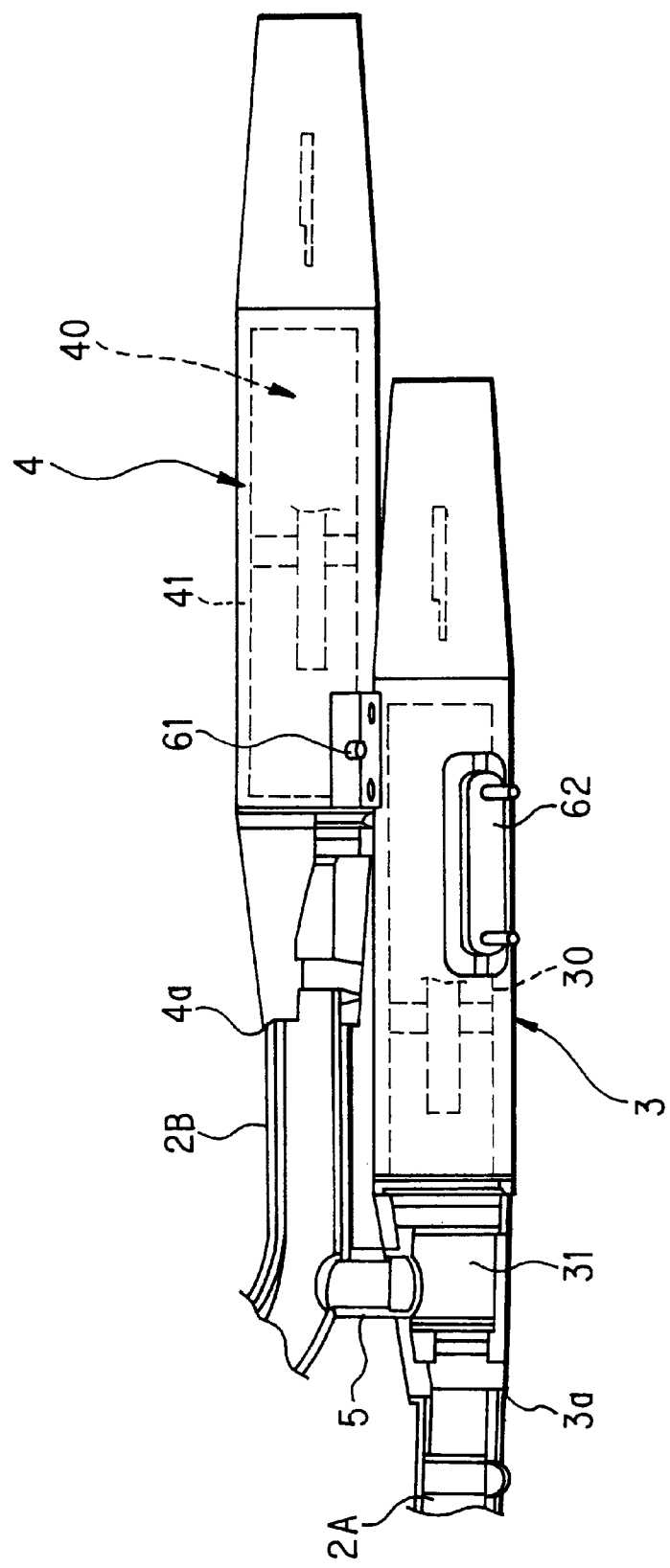
FIG. 2 is an enlarged plan and partially cutaway sectional view showing a conventional exhaust system wherein front and rear exhaust lines are communicated with each other.
Figure 3:
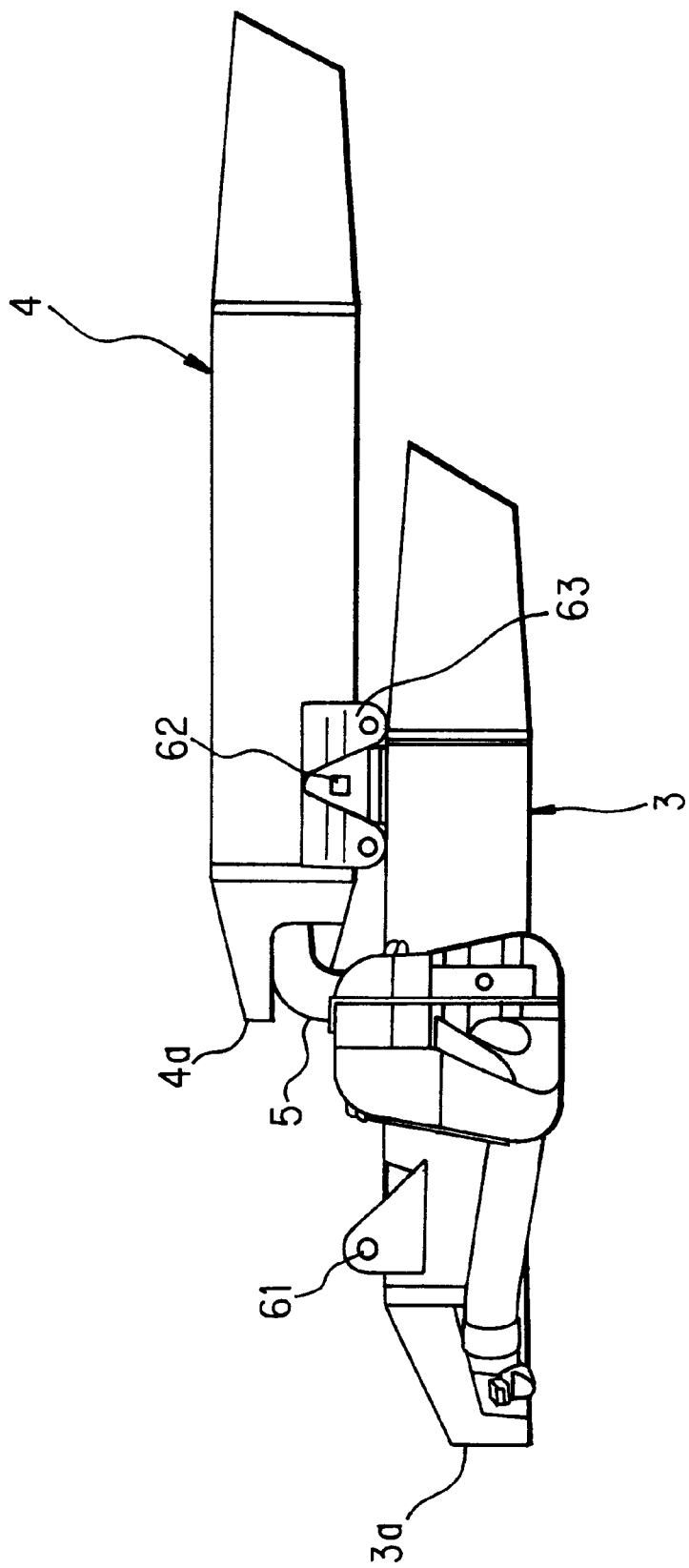
FIG. 3 is an enlarged side view from the outer side of the vehicle, showing a state where a pair of mufflers connected to front and rear exhaust lines of another conventional exhaust system are assembled.

Here, in the exhaust arrangement of the illustrated embodiment of the present invention, like parts corresponding to those of the conventional motorcycle exhaust systems shown in FIGS. 1 to 3 are explained using the same reference numerals.

Figure 4:
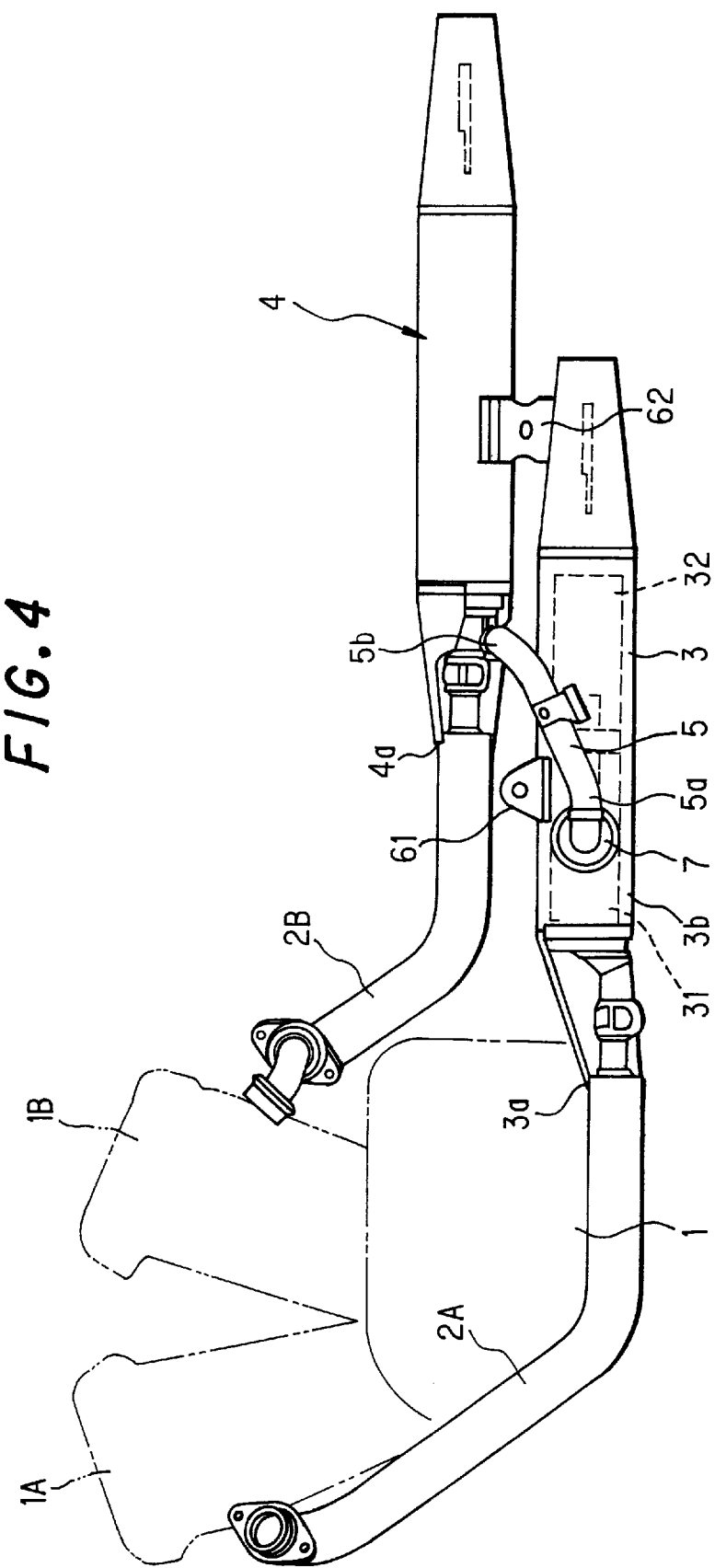
FIG. 4 is a side view viewed from the inner side of the vehicle, showing one embodiment of an exhaust system for a motorcycle of the present invention.
Figure 5:
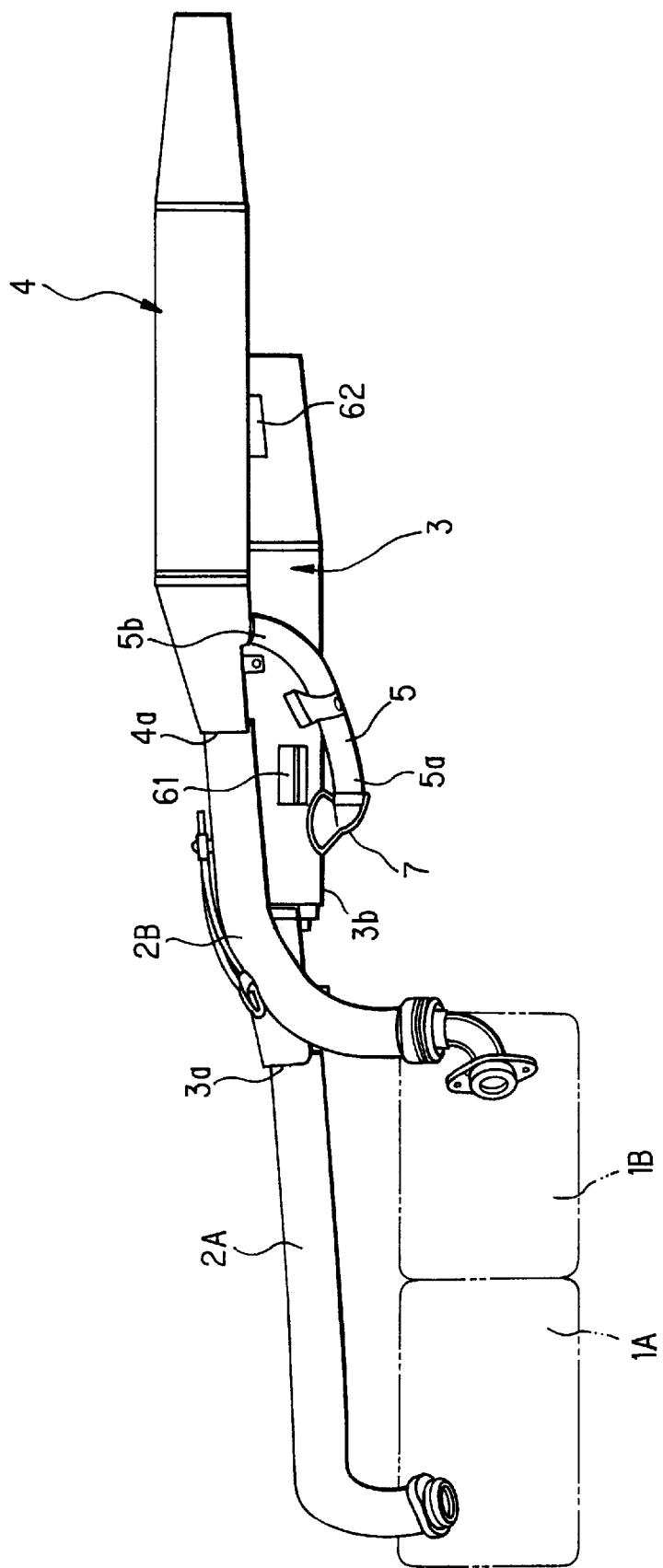
FIG. 5 is a plan view of FIG. 4.
Figure 6:
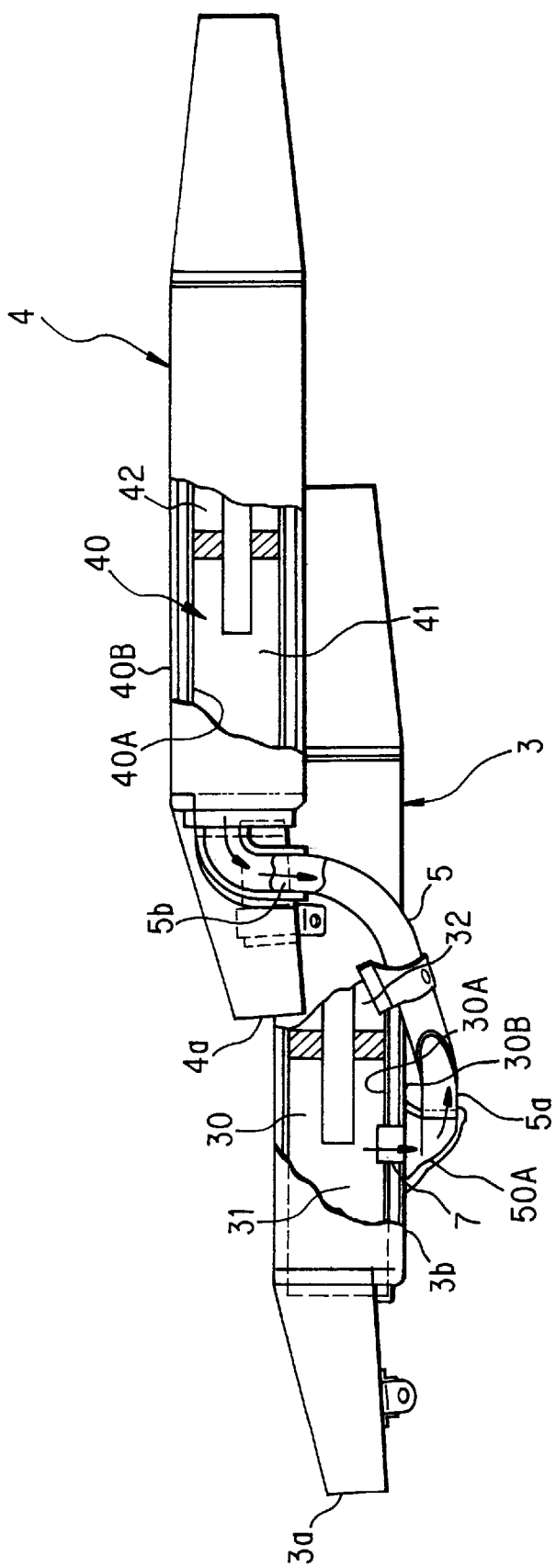
FIG. 6 is an enlarged plan and partially cutaway sectional view showing the exhaust system wherein front and rear exhaust lines are communicated with each other; and, FIG. 7 is an enlarged side view from the outer side of the vehicle, showing a state where front and rear mufflers of the exhaust system are assembled.

FIGS. 4 to 6 show the overall configuration of an exhaust system connected to the exhaust lines of a motorcycle in which a fore-and-aft V-type engine 1 having front and rear cylinders 1A and 1B arranged V-angled to each other along the front-to-rear direction of the vehicle body is mounted similarly to the conventional exhaust system as described in FIG. 1.

In this front-to-rear V type motorcycle engine 1, the first exhaust line of a front cylinder 1A is arranged so that a first exhaust pipe 2A is extended from the front side of cylinder 1A, creating a forward exhaust arrangement while the second exhaust line of a rear cylinder 1B is arranged so that a second exhaust pipe 2B is extended from the rear side of rear cylinder 1B, creating a backward exhaust arrangement.

First and second exhaust pipes 2A and 2B originating from these front and rear cylinders 1A and 1B are connected to the front-end entrance ports 3a and 4a of first and second mufflers 3 and 4 which are arranged below and above on one side, either right or left, in the rear-half of the vehicle in cylindrical shape, so as to be parallel to each other, while the first and second exhaust lines are connected to each other by a communicating pipe 5. This is the arrangement of the exhaust system.

The first and second mufflers 3 and 4 are arranged so that second muffler 4 is shifted behind with respect to first muffler 3 while communicating pipe 5 is arranged so that its one end 5a is joined to the peripheral surface of the first muffler cylinder (the peripheral surface of an aftermentioned outer cylinder 30B) corresponding to a first expansion chamber 31 of first muffler 3 and the other end 5b is connected in parallel with second exhaust pipe 2B to front-end entrance port 4a of second muffler 4 corresponding to a first expansion chamber 41 of second muffler 4.

Expansion chamber 31 of first muffler 3 is partitioned into two parts, i.e., first chamber 31 located on entrance port 3a side and a second expansion chamber 32 located behind and adjacent to the first expansion chamber 31. Further, first muffler 3 has a double-wall configuration made up of inner and outer cylinders 30A and 30B.

Further, expansion chamber 40 of second muffler 4 is partitioned into two parts, i.e., first chamber 41 located on entrance port 4a side and a second expansion chamber 42 located behind and adjacent to the first expansion chamber 41. This expansion chamber 40 of second muffler 4 also has a double-wall configuration made up of inner and outer cylinders 40A and 40B, like expansion chamber 30 of first muffler 3.

A coupling port (through-connection element) 7 which passes through inner and outer cylinders (30A and 30B) to allow for communication with first expansion chamber 31 is arranged at the position on the peripheral surface of muffler outer cylinder 30B to which communicating pipe 5 is joined. Connecting end 5a of communicating pipe 5 has an opening greater in diameter than that of coupling port 7 formed on the periphery of muffler outer cylinder 30B and is attached to the peripheral surface of muffler outer cylinder 30B so that an opening 50A of communicating pipe 5 at connecting end 5a covers the opening of coupling portion 7.

Connecting end 5b of communicating pipe 5 is connected to the first expansion chamber 41 side of second muffler 4 in such a manner that the connecting end is inserted parallel to exhaust pipe 2B and connected to entrance port 4a of second muffler 4. This coupling arrangement enables efficient use of mutual exhaust interference and can reduce the piping length of communicating pipe 5. Therefore, the interior space between first and second mufflers 3 and 4 can be efficiently used also other than piping.

First and second mufflers 3 and 4 are coupled integrally by communicating pipe 5 in the front and also by a second bracket 62 in the rear while a first bracket 61 is provided in the forepart of the first muffler which is located ahead, so that these mufflers are fitted and supported on the vehicle body by this first bracket and the aforementioned second bracket.

Figure 7:
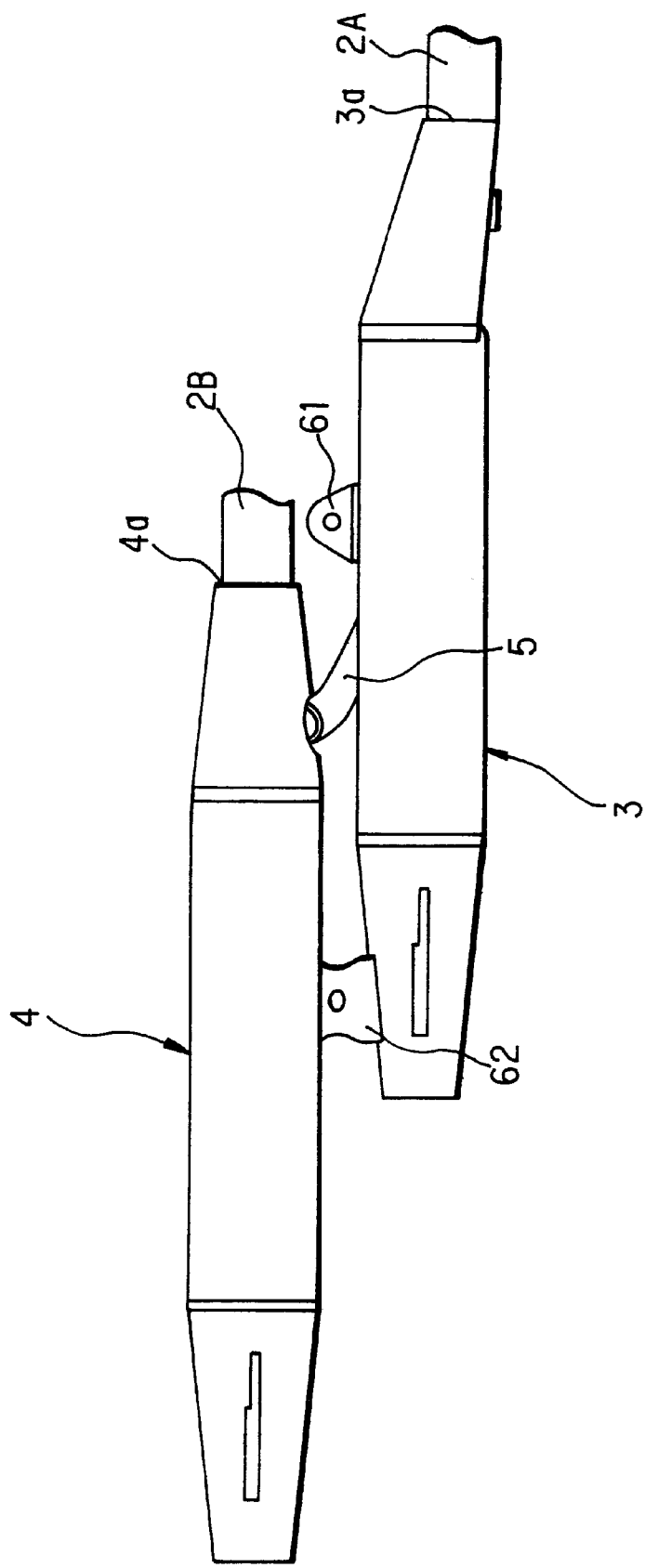

That is, when the above exhaust system is assembled to vehicle body A, first muffler 3 is fitted at its approximately center and at the rear end by means of first and second bracket 61 and 62 while the approximate center of second muffler 4 is commonly fixed by second bracket 62 located at the rear end of first muffler 3, as shown in FIG. 7. Thus, first muffler 3 and second muffler 4 are coupled integrally by communicating pipe 5 in the front position and by second bracket 62 at the rear position while first bracket 61 is arranged in the front part of first muffler 3 which is located ahead so that the exhaust system is attached and supported on the vehicle body by this first bracket 61 and the aforementioned second bracket 62.

To sum up, in the present invention, since the exhaust system is assembled to vehicle body A as above, second muffler 4 is supported by first muffler 3 at two points, in the front and rear, by communicating pipe 5 and second bracket 62. Therefore, it is possible to enhance the assembly stiffness and strength of second muffler 4 to vehicle body A, whereby it is possible to prevent durability degradation of the mufflers due to vibrations of the vehicle or other causes as well as to reduce the number of assembly parts.

The present invention should not be limited to the above embodiment, many changes and modifications can be made without departing from the scope and spirit of the present invention.

As has been described heretofore, according to the present invention, the first and second mufflers are arranged so that the second muffler is shifted behind with respect to the first muffler while the communicating pipe is arranged so that one end thereof is joined to the peripheral surface of the muffler cylinder corresponding to the first expansion chamber of the first muffler and the other end is connected in parallel with the second exhaust pipe to the front-end entrance port of the second muffler corresponding to the first expansion chamber of the second muffler. Therefore, this configuration provides efficient use of mutual exhaust interference and permits effective space use, thus making it possible to make the whole arrangement compact.

In addition, in the present invention, since one end of the communicating pipe is joined to the peripheral surface of the muffler cylinder corresponding to the first expansion chamber of the first muffler while the other end is connected in parallel with the second exhaust pipe to the front-end entrance port of the second muffler corresponding to the first expansion chamber of the second muffler, the communicating pipe is reduced in length. Therefore, the space between the first and second mufflers can be utilized efficiently also other than piping and the communication pipe can be arranged in the interior space between the first and second mufflers, which contributes to a good appearance.

Further, the first muffler has a double-wall configuration made up of inner and outer cylinders and a through-connection element which passes through the inner and outer cylinders of the first muffler is arranged at the approximate central position on the peripheral surface of the first muffler to which the communicating pipe is joined and the connecting end of the communicating pipe has an opening greater in diameter than that of the opening of the through-connection element formed on the periphery of the muffler outer cylinder and is attached to the peripheral surface of the muffler outer cylinder so that the opening of the communicating pipe at the connecting end covers the opening of the through-connection element. Therefore, it is possible to shut out the inflow of a high temperature exhaust gas into the interior space between the inner and outer cylinders of the first muffler, hence it is possible to prevent tarnish of the metal-plated, external muffler surface of the outer cylinder due to engine exhaust.

Finally, in the present invention, the first and second mufflers are coupled integrally by the communicating pipe in the front and also by a second bracket in the rear while the first bracket is provided in the forepart of first muffler which is located ahead, so that the mufflers are fitted and supported on the vehicle body by both the first and second brackets. Therefore, the second muffler can be supported by the front and rear two points, i.e., the communicating pipe and the second bracket. Accordingly, it is possible to enhance the assembly stiffness and strength of the second muffler to the vehicle body, whereby it is possible to prevent durability degradation of the mufflers due to vibrations of the vehicle or other causes as well as to reduce the number of assembly parts. Thus, it is possible to improve the assembly workability and reduce the cost.

What is claimed is:

1. An exhaust system for a motorcycle in which a fore-and-aft V-type engine having front and rear cylinders arranged in a V-angled to each other along the front-to-rear direction of the vehicle body is mounted, wherein the first exhaust line from the front cylinder includes a first exhaust pipe which is extended from the front side of the front cylinder, creating a forward exhaust arrangement while the second exhaust line from the rear cylinder includes a second exhaust pipe which is extended from the rear side of the rear cylinder, creating a backward exhaust arrangement, and the first and second exhaust pipes originating from the front and rear cylinders are connected to the respective front-end entrance ports of the first and second mufflers which are arranged below and above on one side, either right or left, in the rear-half of the vehicle in cylindrical shape, so as to be parallel to each other, while the first and second exhaust lines are connected to each other by a communicating pipe, characterized in that the first and second mufflers are arranged so that the second muffler is shifted behind with respect to the first muffler while the communicating pipe is arranged so that one end thereof is joined to the peripheral surface of the muffler cylinder corresponding to the first expansion chamber of the first muffler and the other end is connected in parallel with the second exhaust pipe to the front-end entrance port of the second muffler corresponding to the first expansion chamber of the second muffler.

2. The exhaust system for a motorcycle according to claim 1, wherein the first muffler has a double-wall configuration made up of inner and outer cylinders and a through-connection element which passes through the inner and outer cylinders to allow for communication with first expansion chamber is arranged at the position on the peripheral surface of the first muffler outer cylinder to which the communicating pipe is joined, characterized in that the connecting end of the communicating pipe has an opening greater in diameter than that of the opening of the through-connection element formed on the periphery of the muffler outer cylinder and is attached to the peripheral surface of the muffler outer cylinder so that the opening of the communicating pipe at the connecting end covers the opening of the through-connection element.

3. The exhaust system for a motorcycle according to claim 1, wherein the first and second mufflers are coupled integrally by the communicating pipe in the front and also by a second bracket in the rear while a first bracket is provided in the forepart of first muffler which is located ahead, so that the mufflers are fitted and supported on the vehicle body by both the first and second brackets.

4. The exhaust system for a motorcycle according to claim 2, wherein the first and second mufflers are coupled integrally by the communicating pipe in the front and also by a second bracket in the rear while a first bracket is provided in the forepart of first muffler which is located ahead, so that the mufflers are fitted and supported on the vehicle body by both the first and second brackets.

* * * * *